United States Patent
Kasbarian et al.

(10) Patent No.: US 7,379,802 B2
(45) Date of Patent: May 27, 2008

(54) METHOD OF DAMPING THE PARASITIC VIBRATIONS COMING FROM THE FRONT AXLE ASSEMBLY OF A MOTOR VEHICLE

(75) Inventors: Jean-Marc Kasbarian, Lyons (FR); Sebastien Bourdrez, Lyons (FR); Richard Chauvel-Sanz, Sainte-Foy-les-Lyon (FR)

(73) Assignee: KOYO Steering Europe (K.S.E.), Irigny (FR)

( * ) Notice: Subject to any disclaimer, the term of this patent is extended or adjusted under 35 U.S.C. 154(b) by 567 days.

(21) Appl. No.: 10/505,427

(22) PCT Filed: Mar. 5, 2003

(86) PCT No.: PCT/FR03/00709

§ 371 (c)(1),
(2), (4) Date: Oct. 5, 2004

(87) PCT Pub. No.: WO03/076251

PCT Pub. Date: Sep. 18, 2003

(65) Prior Publication Data

US 2005/0119810 A1    Jun. 2, 2005

(30) Foreign Application Priority Data

Mar. 13, 2002    (FR)    ................... 02 03127

(51) Int. Cl.
*B62D 5/04* (2006.01)
*F16F 15/02* (2006.01)

(52) U.S. Cl. .................. 701/36; 701/41; 701/42; 180/415; 180/443; 187/292

(58) Field of Classification Search .......... 701/41, 701/42, 36; 187/292, 293; 180/415, 443
See application file for complete search history.

(56) References Cited

U.S. PATENT DOCUMENTS

| | | | |
|---|---|---|---|
| 5,828,014 A | | 10/1998 | Goto et al. |
| 6,134,490 A | * | 10/2000 | Ito et al. ...................... 701/42 |
| 6,380,706 B1 | * | 4/2002 | Kifuku et al. .............. 318/434 |
| 6,431,307 B2 | * | 8/2002 | Yoshida ...................... 180/446 |
| 6,681,165 B2 | * | 1/2004 | Shibasaki et al. ............. 701/41 |
| 2002/0087241 A1 | * | 7/2002 | Nakano et al. ............... 701/41 |
| 2002/0125084 A1 | * | 9/2002 | Kreuzer et al. .......... 188/267.1 |
| 2003/0106736 A1 | * | 6/2003 | Kogiso et al. .............. 180/446 |

FOREIGN PATENT DOCUMENTS

DE    103 92 427 B4    3/2007
EP    1 142 746 A2    10/2001

* cited by examiner

*Primary Examiner*—Tan Q Nguyen
(74) *Attorney, Agent, or Firm*—Oliff & Berridge, PLC

(57) ABSTRACT

The invention relates to a method for motor vehicles provided with an electrical sero steering controlled by an electronic processor. The method comprises using an electrical signal within the processor which has at least one component image of the parasite vibrations coming from the front subframe. Said signal is filtered such as to isolate the component image of the parasite vibrations, from which a corrective value for the control current, which controls the electric servo motor for the steering, is calculated. The corrective value thus calculated is subtracted from the current control, determined by taking into account other parameters, to give a corrected control current, which gives to rise to an attenuation in the vibrations transmitted to the steering system and the steering wheel by acting on the servo steering.

15 Claims, 3 Drawing Sheets

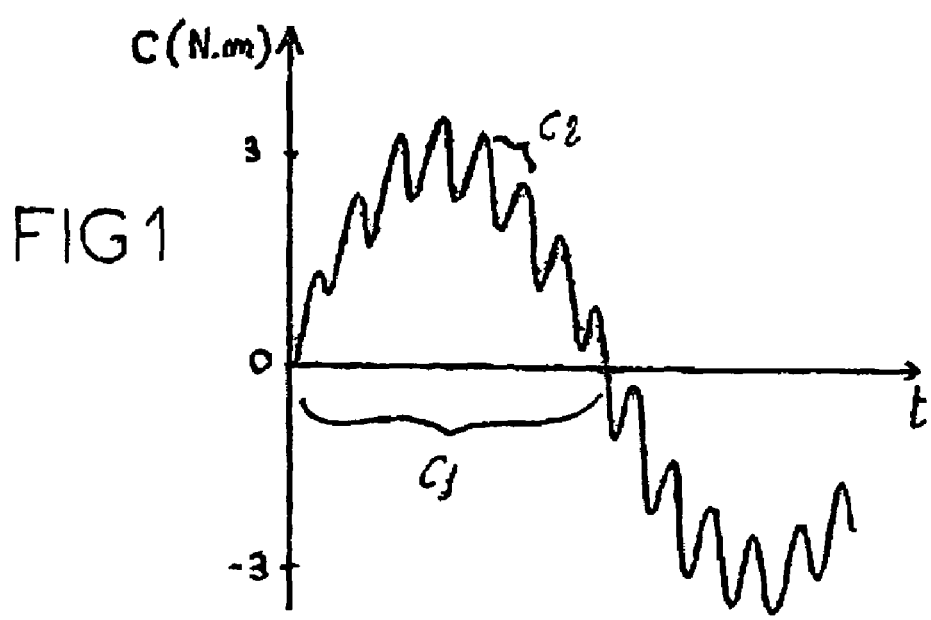
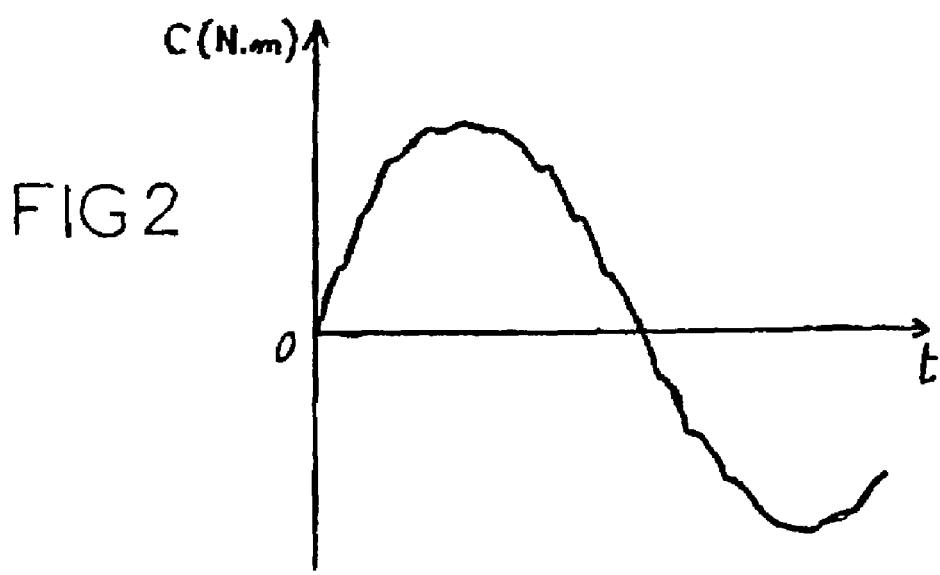

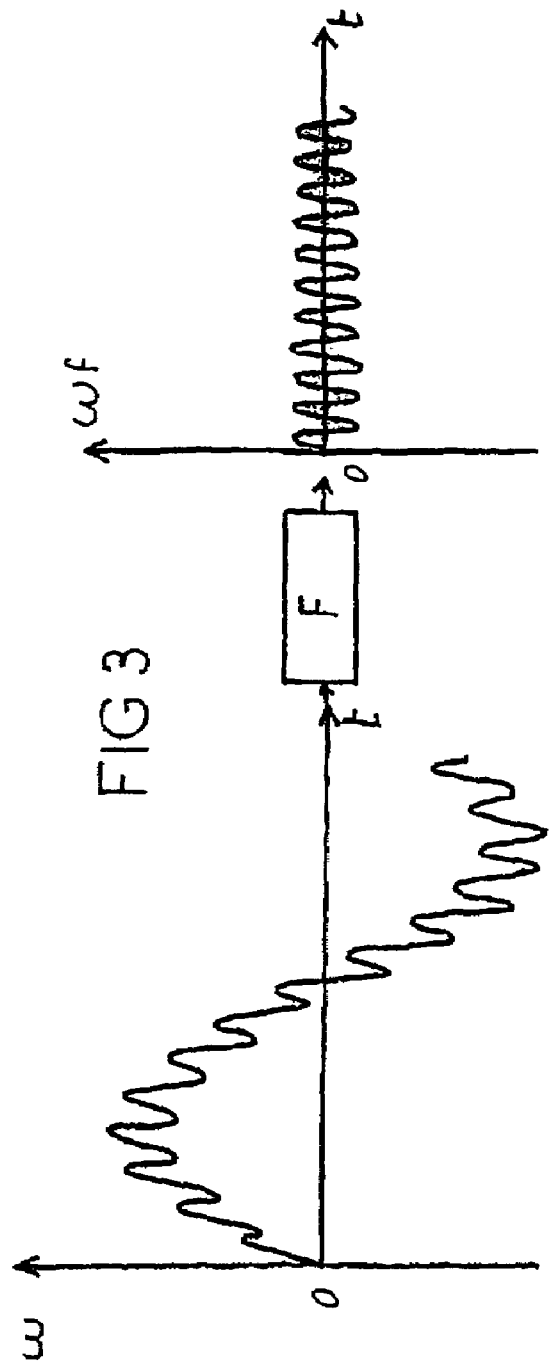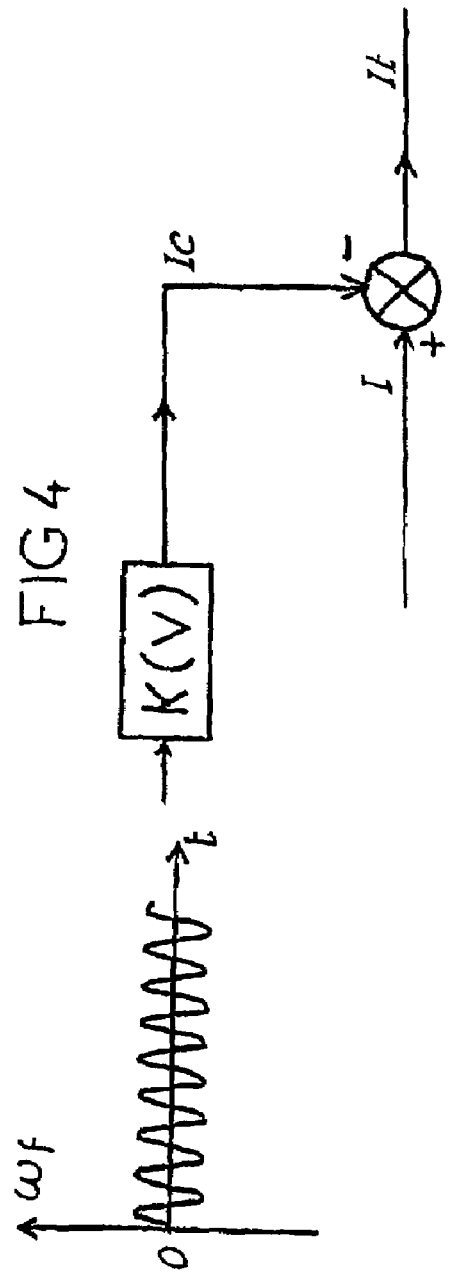

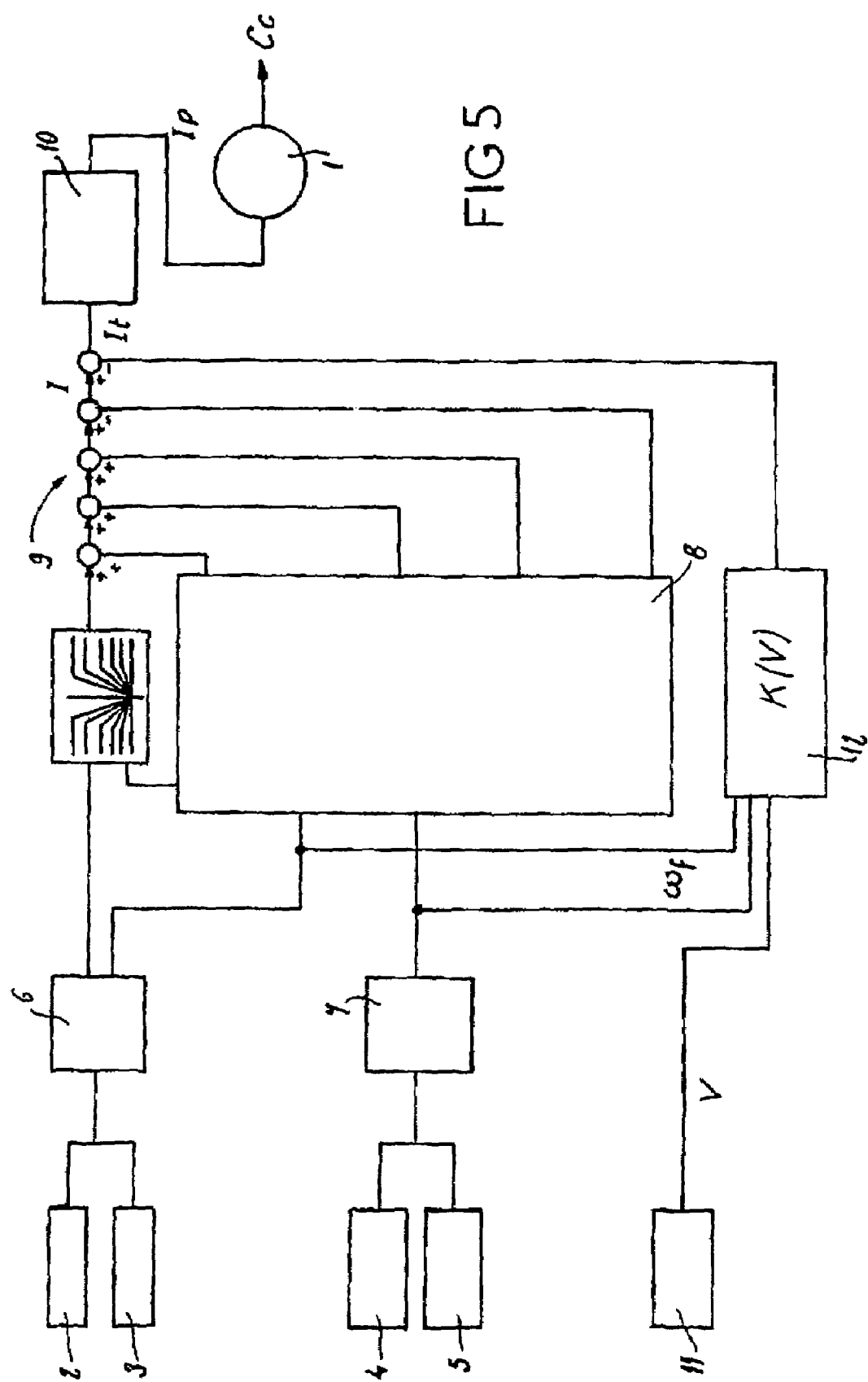

METHOD OF DAMPING THE PARASITIC VIBRATIONS COMING FROM THE FRONT AXLE ASSEMBLY OF A MOTOR VEHICLE

The present invention relates to a method of damping the parasitic vibrations coming from the front axle assembly of a motor vehicle, this method being applied to motor vehicles fitted with electric-type power steering, using an electric power-steering motor controlled by an electronic computer.

Motor vehicles are often subjected to parasitic vibrations, coming from their front axle assembly, which may especially result from excitation due to wheel imbalance. This is because, even after a wheel has been balanced, it happens that a mode of vibrations persists. These vibrations are transmitted, from the front axle assembly, to the steering system unit and from there to the steering wheel, the steering system being all the more sensitive to the vibrations the lower the friction and inertia involved in this system in order to obtain a sufficiently smooth operation.

Thus, the vibrations emanating from the front axle assembly can make the steering system resonate, for example within the usual torsion bar of an electric power-steering system. In addition, these vibrations generate a parasitic torque on the steering wheel, this torque being felt by the driver and decreasing the driving comfort of the vehicle.

The object of the present invention is to eliminate these drawbacks, by providing a method for eliminating, or at least attenuating, the parasitic vibrations coming from the front axle assembly, and to do so by taking advantage of the specific features of an electric power-steering system with which, at the present time, vehicles are being increasingly fitted.

For this purpose, the subject of the invention is a method of damping parasitic vibrations coming from the front axle assembly of a motor vehicle fitted with electric power steering, using a power-steering electric motor controlled by an electronic computer that delivers an electrical setpoint current, taking into account various parameters, from which the power current of the power-steering electric motor is established, the damping method consisting essentially in:

having available in the computer an electrical signal which possesses a component that is the image of the parasitic vibrations coming from the front axle assembly of the vehicle;

processing said signal so as to isolate its component that is the image of the parasitic vibrations;

calculating, from the parasitic component thus isolated, a correction current for correcting the aforementioned setpoint current; and applying the calculated correction current to the setpoint current, determined by taking other parameters into account, in order to control the electric power-steering motor.

Thus, the method forming the subject of the invention makes it possible to "erase" the parasitic vibrations transmitted to the steering system and to restore the driving comfort, the invention being based on the observation that a simple suitable corrective action, exerted by the electric power steering, allows the parasitic vibrations coming from the front axle assembly to be damped. The simplicity and the low cost of the solution proposed by the invention should be noted, which invention requires no additional sensor, makes use of the possibilities afforded by a computer already existing on any vehicle fitted with electric power steering and, finally, corrects the parasitic vibrations only by modulating the power-assisted torque exerted on the steering system.

The electrical signal, in voltage or current form, used here in the computer owing to the fact that it "contains" the parasitic component, is for example the speed of the electric power-steering motor.

The processing of this signal, for the purpose of isolating its component that is the image of the parasitic vibrations to be damped, is advantageously a filtering that lets through the high-frequency component or components and that eliminates however, from this signal, the low-frequency component or components, especially those that are imposed by the driver of the vehicle in question.

The calculation of the correction current, from the isolated parasitic component, may also take into account at least one other parameter, such as for example the speed of the vehicle. This parameter-assigned calculation may be a simple multiplication by a variable "gain", which depends for example on the speed of the vehicle. It may also be a more complex calculation, of the "transfer function" kind.

As regards the final application of the correction current, thus calculated, to the setpoint current, this may be a simple subtraction of the correction current from the setpoint current determined on the basis of other parameters, so as to deliver, as a result of this subtraction, the final setpoint current, which, when transformed into a control current, will control the electric power steering by correcting the vibrations coming from the front axle assembly of the vehicle, in such a way that the torque at the steering wheel is "smoothed", that is to say practically free of parasitic vibrations.

It should be noted that the method forming the subject of the invention, which constitutes a "countermeasure" to the parasitic vibrations coming from the front axle assembly, also applies with a satisfactory result when several causes of parasitic vibration exist simultaneously, that is to say several parasitic vibration frequencies that are superposed, the method then making it possible to isolate and correct all the parasitic components.

The invention will be more clearly understood with the aid of the following description of an example of how this method of damping the parasitic vibrations coming from the front axle assembly of a motor vehicle is implemented, with reference to the appended schematic drawing in which:

FIG. 1 is a diagram illustrating an example of parasitic torque, before correction;

FIG. 2 is a diagram illustrating an example of parasitic torque corrected by the method of the invention;

FIG. 3 is a diagram illustrating the first steps of the method of the invention;

FIG. 4 is another diagram, illustrating the next steps of this method; and

FIG. 5 is a block diagram of a device for implementing the method of the invention.

FIG. 1 illustrates an example of parasitic torque C at the steering wheel, which varies as a function of time t. The torque C has a low-frequency component C1, imposed by the driver of the vehicle, which component C1 is shown as a sinusoid but which may be of any form. The torque C at the steering wheel also possesses a high-frequency component C2, emanating from the vibrations of the front axle assembly of the vehicle, this parasitic component C2 having to be eliminated or at least greatly attenuated.

FIG. 2, similar to FIG. 1, illustrates the "smoothed" torque C' at the steering wheel, that is to say one that is reduced practically to its low-frequency component C1, the high-frequency parasitic component C2 having been "erased".

To achieve such a "smoothed" torque, the method of the invention consists, in a first step, in processing an information item available in the electric power-steering computer in the form an electrical voltage or current, this information item being, for example, the instantaneous speed of rotation ω of the electric power-steering motor, chosen here as it itself has a component that is the image of the parasitic component C2 considered above, and therefore of the parasitic vibrations coming from the front axle assembly of the vehicle.

Thanks to digital filtering, the "parasitic" component of the power-steering motor speed ω is isolated. As illustrated in FIG. 3, a simple "high-pass" filter F, applied to the speed ω, delivers a filtered signal ωf which constitutes the parasitic contribution.

In the next step, illustrated by FIG. 4, the filtered signal or parasitic contribution ωf is used in a parameter-assigned calculation for determining a correction current Ic. The parameter-assigned calculation operation, shown symbolically here by the formula K(V), takes the speed V of the vehicle and/or other parameters into consideration.

In the last step, also illustrated by FIG. 4, the correction current Ic is subtracted from the setpoint current I, taking various parameters into account, which setpoint current is usually determined by the computer in order to control the electric power-steering motor. Finally, the subtraction of the correction current Ic from the setpoint current I delivers a corrected total setpoint current It, which will control the electric power-steering motor.

By virtue of this adapted correction, the parasitic vibrations are "erased" and the "smoothed" steering wheel torque illustrated in FIG. 2 is obtained.

FIG. 5 shows diagrammatically, and by way of example, a device for implementing the parasitic vibration damping method described above. This device comprises the usual means for controlling the electric power-steering motor 1 of the vehicle in question, together with:

sensors 2 and 3 placed on the steering system;

units 4 and 5 that deliver signals internal to the power steering or the vehicle;

circuits 6 and 7 for shaping the signals coming from the sensors 2, 3 and from the units 4, 5;

a control law unit 8;

circuits 9 that deliver the setpoint current I, obtained from the various shaped signals and from the control law unit 8; and a converter 10 which, on the basis of the setpoint current, establishes a control current Ip sent to the electric power-steering motor 1.

According to the invention, a unit 11 also delivers the speed V of the vehicle, which is processed in a computing unit 12 that also receives the signal of, and delivers the correction current Ic, subtracted from the current I, in order to deliver the corrected total setpoint current It. It is this corrected setpoint current It that is transformed, in the converter 10, into a power current feeding the electric power-steering motor 1, which thus delivers a corrected power-steering torque Cc allowing the parasitic vibrations to be "erased".

It would not be outside the scope of the invention, as defined in the appended claims, whatever in particular the signal used in the computer, since the latter possesses a component that is the image of the parasitic vibrations to be eliminated, and also whatever the particular function used in the calculation of the correction current, it being possible for this function to involve various parameters, such as the speed of the vehicle, the steering speed, the angle of the steering wheel, etc.

The invention claimed is:

1. A method of damping parasitic vibrations coming from the front axle assembly of a motor vehicle fitted with electric power steering, using a power-steering electric motor controlled by an electronic computer that delivers a target current, taking into account various parameters, from which a power current of the power-steering electric motor is established, the damping method comprising:

receiving an electrical signal which possesses a parasitic portion that represents the parasitic vibrations coming from the front axle assembly of the vehicle;

processing the electrical signal so as to isolate the parasitic portion that represents the parasitic vibrations;

calculating, from the parasitic portion thus isolated, a correction current for correcting the aforementioned target current, applying the calculated correction current to the target current, in order to control the electric power-steering motor, wherein the electrical signal is an available signal relating to the electric power-steering motor.

2. The method as claimed in claim 1, processing of the electrical signal, for the purpose of isolating its component that represents the parasitic vibrations to be damped with a filter that lets through the high-frequency portion or portions, and eliminating from the electrical signal, the low-frequency portion or portions.

3. The method as claimed in claim 2, further comprising calculating, from the parasitic portion, the correction current, also takes into account at least one other parameter.

4. The method as claimed in claim 2, further comprising a final application of the calculated correction current to the target current is a subtraction of the correction current from the target current so as to deliver, as a result of this subtraction, the final target current, which, when transformed into a control current, controls the electric power steering by correcting the vibrations coming from the front axle assembly of the vehicle.

5. The method as claimed in claim 1, further comprising calculating, from the parasitic portion, the correction current, also takes into account at least one other parameter.

6. The method as claimed in claim 5, wherein the at least one other parameter includes the speed of the vehicle.

7. The method as claimed in claim 6, further comprising the at least one other parameter is a multiplication by a variable "gain", wherein the gain is a function of the speed of the vehicle.

8. A method as claimed in claim 6, further comprising the at least one other parameter is a transfer function calculation.

9. The method as claimed in claim 6, further comprising a final application of the calculated correction current to the target current is a subtraction of the correction current from the target current so as to deliver, as a result of this subtraction, the final target current, which, when transformed into a control current, controls the electric power steering by correcting the vibrations coming from the front axle assembly of the vehicle.

10. The method as claimed in claim 5, further comprising the at least one other parameter is a multiplication by a variable "gain", wherein the gain is a function of the speed of the vehicle.

11. The method as claimed in claim 10, further comprising a final application of the calculated correction current to the target current is a subtraction of the correction current from the target current so as to deliver, as a result of this subtraction, the final target current, which, when transformed into a control current, controls the electric power steering by correcting the vibrations coming from the front axle assembly of the vehicle.

12. A method as claimed in claim 5, further comprising the at least one other parameter is a transfer function calculation.

13. The method as claimed in claim 12, further comprising a final application of the calculated correction current to the target current is a subtraction of the correction current from the target current so as to deliver, as a result of this subtraction, the final target current, which, when transformed into a control current, controls the electric power steering by correcting the vibrations coming from the front axle assembly of the vehicle.

14. The method as claimed in claim 5, further comprising a final application of the calculated correction current to the target current is a subtraction of the correction current from the target current so as to deliver, as a result of this subtraction, the final target current, which, when transformed into a control current, controls the electric power steering by correcting the vibrations coming from the front axle assembly of the vehicle.

15. The method as claimed in claim 1, further comprising a final application of the calculated correction current to the target current is a subtraction of the correction current from the target current so as to deliver, as a result of this subtraction, the final target current, which, when transformed into a control current, controls the electric power steering by correcting the vibrations coming from the front axle assembly of the vehicle.

* * * * *

UNITED STATES PATENT AND TRADEMARK OFFICE
CERTIFICATE OF CORRECTION

| | | |
|---|---|---|
| PATENT NO. | : 7,379,802 B2 | Page 1 of 1 |
| APPLICATION NO. | : 10/505427 | |
| DATED | : May 27, 2008 | |
| INVENTOR(S) | : Jean-Marc Kasbarian, Sebastien Bourdrez and Richard Chauvel-Sanz | |

It is certified that error appears in the above-identified patent and that said Letters Patent is hereby corrected as shown below:

Title Page, Please correct the Assignee as follows:

Item (73) Assignee:  JTEKT Europe

Signed and Sealed this

Nineteenth Day of May, 2009

JOHN DOLL
*Acting Director of the United States Patent and Trademark Office*